July 7, 1925.  1,545,287
T. J. STEPHENSON
BRAKE LOCK
Filed April 25, 1923
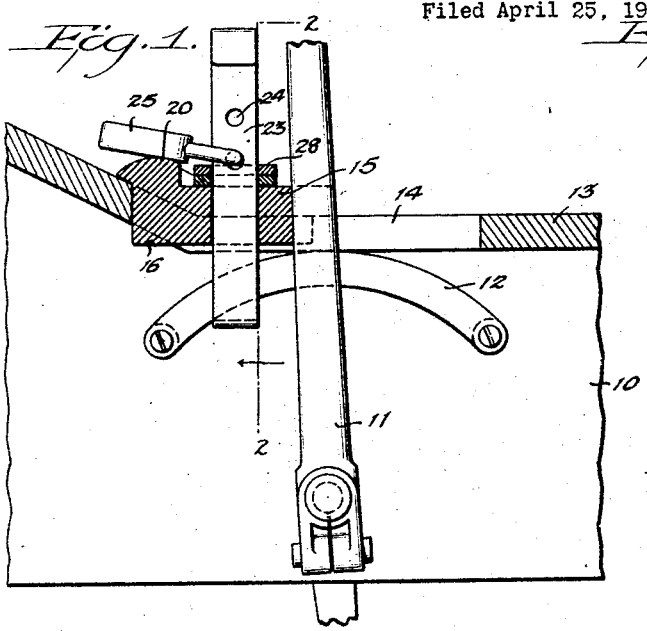
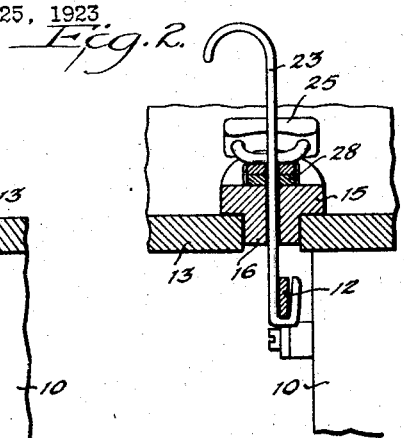
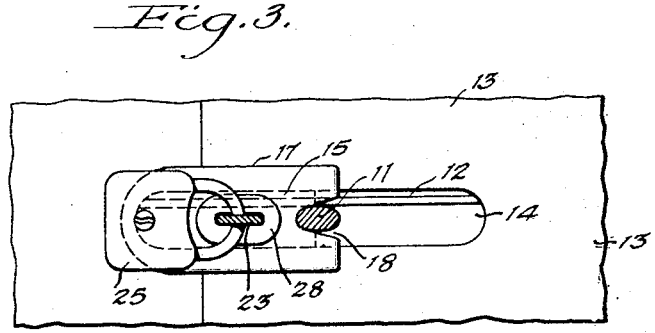
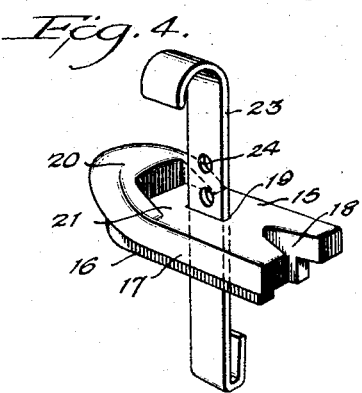
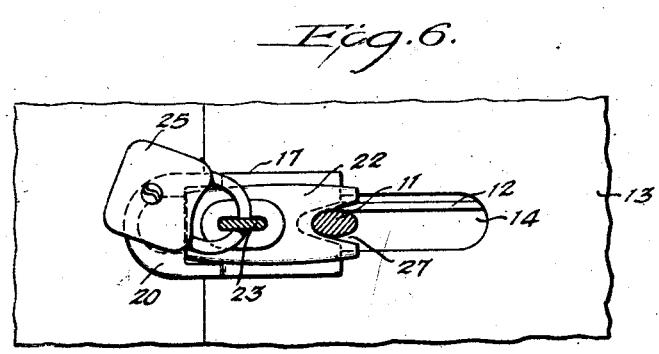
WITNESSES
INVENTOR
THOMAS J. STEPHENSON
BY
ATTORNEYS Patented July 7, 1925.

1,545,287

UNITED STATES PATENT OFFICE.

THOMAS J. STEPHENSON, OF RED BANK, NEW JERSEY.

BRAKE LOCK.

Application filed April 25, 1923. Serial No. 634,625.

*To all whom it may concern:*

Be it known that I, THOMAS J. STEPHENSON, a citizen of the United States, and a resident of Red Bank, in the county of Monmouth and State of New Jersey, have invented new and useful Improvements in Brake Locks, of which the following is a full, clear, and exact description.

This invention relates to locks for brake levers and was primarily designed for use with motor vehicles.

The general object of the invention is the provision of a simply constructed, easily operated and durable lock for rigidly fixing the brake lever of a motor vehicle in position when the brakes have been applied.

Another object of the invention is the provision of a motor vehicle lock provided with an attachment that may be mounted on the lock to compensate for wear, thus giving as positive a rigid locking of the brake lever after the device has been used for some considerable time as is obtained when the device is new.

These objects are accomplished by providing a block for mounting in the ordinary floor board slot to prevent operation of the brake lever when the brakes have been applied, and providing in conjunction with said block means for locking it in position in the slot.

These and other objects of the invention will be more clearly understood from the following detailed description and accompanying drawings.

Figure 1 is a vertical section through the lock showing it mounted in position in the floor board slot of a motor vehicle and locked in position;

Figure 2 is a vertical transverse section along the line 2—2, Figure 1;

Figure 3 is a top plan view of the locking device showing it mounted in the floor board slot of a motor vehicle;

Figure 4 is a perspective view of the lock;

Figure 5 is a perspective view of an attachment for mounting on the lock to compensate for wear;

Figure 6 is a top plan view of the lock showing the wear compensating attachment mounted in position.

Referring to the above-mentioned drawings, a portion of the motor vehicle frame 10 is shown and carrying an emergency brake lever 11. 12 is a quadrant with which the block mounted on the brake lever co-operates to retain the brake lever in different positions. Mounted above the quadrant 12 is the floor board 13 provided with a slot 14 in which the brake lever 11 moves.

The invention includes a block 15 having a depending portion 16 shaped to fit in the slot between the portion of the floor board 13 defining the front end of the slot and the brake lever 11 after the lever has been operated to apply the brakes. A flange 17 is formed on the block 15 for seating upon the floor board 13 to support the depending portion 16 in position in the slot 14. In the rear end of this block a notch 18 is provided for receiving the brake lever 11. On the forward end of the block a raised portion 20 is formed, presenting a pocket 21 in which an attachment 22 may seat. An opening 19 is formed in the block 15 for receiving a hook member 23. This hook member is movably mounted in the block and adapted for engaging the quadrant 12. A plurality of openings 24 are provided in the arm of the hook member 23 for receiving a padlock 25. This padlock serves to lock the hook member 23 in position in engagement with the quadrant 12 and to fix the block 15 in position in the slot 14. The upper end of the hook member 23 is curved so as to prevent it from dropping through the block 15.

An attachment or block 22, shaped to seat in the pocket 21 of the block 15 is provided to compensate for wear. When the block 15 defining the end of the notch 18 has become worn so as to permit of a certain movement of the brake lever the block 22 is mounted thereon, seating in the pocket 21. An opening 26 is provided in the block 22 for receiving the hook member 23. This opening 26 registers with the opening 19 in the block 15 when the block 22 is seated in the pocket 21. A notch 27 is provided in the block 22 for receiving the brake lever 11. The portion of the block 22 defining the rear end of the notch 27 is located forward of the portion of the block 15 defining the end of the notch 18, as shown by the dotted lines in Figure 6. After the block 15 has become worn so that it is nearly useless this block or attachment 22 may be mounted thereon to give the lock as positive a locking action as it originally had.

The operation of this locking device is as follows:

After the brake 11 has been drawn backward, applying the brakes, the block 15 is dropped into the slot 14 between the portion of the floor board 13 defining the front portion of the slot 18 and the brake lever 11, the latter seating in the slot 18. The hook member 23 which is movably mounted in the block 15, is then drawn upward, firmly engaging the quadrant 12. The padlock 25 is then connected to the hook member 23 by projecting the ring member through one of the openings 24. If the ring member does not bear tightly on the block 15 one or more washers 28 may be fitted over the upper end of the hook member 23, giving a tight connection.

I would state in conclusion that while the illustrated example constitutes a practical embodiment of my invention I do not limit myself strictly to the exact details herein illustrated since manifestly the same can be considerably varied without departing from the spirit of the invention as defined in the appended claim.

I claim:

The combination with the floor board of a motor vehicle having a slot therein in which a brake lever is movably mounted, a motor vehicle lock comprising a block having its lower portion shaped to fit into the floor board slot, the upper portion seating on the floor board, said block having an opening extending therethrough, a second block for mounting on said first-mentioned block to compensate for wear, said second block having an opening extending therethrough which registers with the opening in the first-mentioned block, a hook for attaching said blocks to the motor vehicle movably mounted in the openings provided in the blocks, and means for locking said hook in position when engaged with the motor vehicle.

THOMAS J. STEPHENSON.